United States Patent Office 3,210,298
Patented Oct. 5, 1965

3,210,298
POLYMERS OF SUBSTITUTED OXACYCLOBUTANES AND PROCESS FOR PREPARING THEM
Klaus Weissermel and Hans Frischkorn, Frankfurt am Main, Germany, assignors to Farbwerke Hoechst Aktiengesellschaft vormals Meister Lucius & Brüning, Frankfurt am Main, Germany, a corporation of Germany
No Drawing. Filed Mar. 28, 1961, Ser. No. 98,782
Claims priority, application Germany, Mar. 31, 1960, F 30,880
6 Claims. (Cl. 260—2)

The present invention relates to polymers of substituted oxacyclobutanes and to a process for preparing same.

It is known to polymerize oxacyclobutanes of the formula

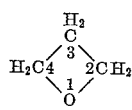

and numerous derivatives of oxacyclobutane which are substituted in 2-, 3- or 4-position in the presence of Friedel-Crafts catalysts to linear polyethers of the general formula $$[-O-CH_2-CH_2-CH_2-]_n$$

Depending on the kind and the number of the substituents at the oxacyclobutane nucleus, crystalline or amorphous polymers are obtained, of which, however, only some polymers, for example, the polymer of 3,3-bis-(chloromethyl)-oxacyclobutane is industrially important.

The object of the present invention is a process for preparing valuable crystalline and rubber-elastic polymers of high molecular weight. According to this process 3,3-disubstituted derivatives of oxacyclobutane of the general formula

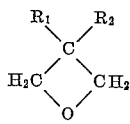

which have not yet been described in the literature are homo- or copolymerized in the presence of an inert organic solvent or by the block polymerization process in the presence of organo-metal catalyst systems, in particular organo-aluminum compounds, or in the presence of known Friedel-Crafts catalysts.

In the above formula $R_1$ and $R_2$ represents each a polyhalogen-alkoxy-alkyl radical or $R_1$ represents a halogen alkyl radical and $R_2$ represents a polyhalogen alkoxy alkyl radical. For example, (I) $R_1=CH_2Cl$, $R_2=CH_2OCF_2-CF_2H$
(II) $R_1=CH_2Cl$, $R_2=CH_2OCF_2-CFClH$
(III) $R_1=CH_2Cl$, $R_2=CH_2OCF_2-CFH-CF_3$
(IV) $R_1=R_2=CH_2OCF_2-CF_2H$
(V) $R_1=R_2=CH_2OCF_2-CFClH$
(VI) $R_1=R_2=CH_2OCF_2-CCl_2H$ The polymerization of new monomers I to III according to the invention leads to the formation of thermostable rubber-elastic colorless polymers of high molecular weight. The polymers are distinguished from synthetic rubber and in part also from natural rubber by their considerably greater Defo-hardness and Defo-elasticity (cf. Examples 1 and 2 given below).

The polymerization of new monomers IV to VI according to the process of the present invention leads to the formation of crystalline polymers of high molecular weight and of softening points above 120° C.

In contradistinction to the polymer of 3,3-bis(chloromethyl)-oxacyclobutane, the polymers of the aforesaid monomers can in most cases easily be cross-linked and thereby be converted into products which are insoluble in the usual organic solvents.

The polymers obtained from monomers I to VI are built up of recurring units of the general formula

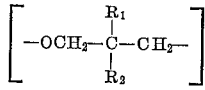

and have an average molecular weight within the range of 10,000 to 500,000 and preferably of above 10,000 to 100,000.

Oxacyclobutane derivatives I to VI are prepared by reacting 3-chloromethyl-3-oxymethyl-oxacyclobutane or 3,3-dioxymethyloxacyclobutane in known manner with the corresponding fluorine-containing olefins in the presence of basic catalysts, preferably in the presence of alkali metal alcoholates.

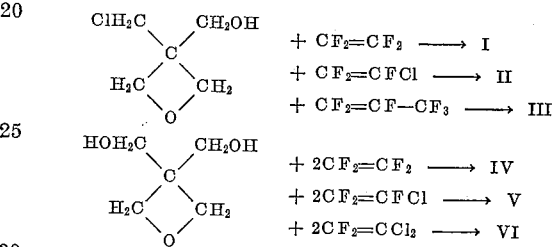

Oxacyclobutane derivatives I to VI are high boiling stable liquids which are advantageously purified by fractional distillation under reduced pressure. The block or solution polymerization of the new monomers is carried out in the presence of Friedel-Crafts catalysts such, for example, as $BF_3$, $SnCl_4$, $SbCl_5$, $ZnCl_2$ or $PF_5$.

The catalysts may be used as such or in the form of the known complex compounds or in the form of the salt-like complex compounds. As suitable compounds there may be mentioned by way of example the complex compounds of boron trifluoride with ethers, for example, the boron trifluoride diethyl etherate or boron trifluoride tetrahydrofurane etherate. As suitable compounds there may also be mentioned oxonium and diazonium salts of boron trifluoride, for example, triethyl-oxonium-fluoroborate and p-nitrophenyl-diazonium-fluoroborate.

Besides, organo-metal compounds, preferably organoaluminum compounds, in combination with halogen-containing organic compounds, in particular in combination with β-halogen substituted aliphatic ethers such as methyl-β-chlorethyl ether, in particular in combination with epihalogen hydrine, for example, epichlorhydrine, may be used with special advantage in the process according to the invention as catalysts for the polymerization of the 3,3-di-substituted oxacyclobutanes indicated above.

As organo-aluminum compounds there may be mentioned by way of example:

Trimethyl aluminum,
Triethyl aluminum,
Tri-i-butyl aluminum,
Trioctyl aluminum,
Di-i-butyl aluminum hydride,
Diethyl ethoxy aluminum,
Diethyl aluminum chloride,
Methyl aluminum dichloride,
Ethyl aluminum dichloride,
Ethyl aluminum sesquichloride.

The quantity of organo-metal compound or compounds may be varied within wide limits and depends on the reactivity of the monomer and the polymerization conditions. Often traces of organo-metal, preferably organo-aluminum, compounds in combination with organic halogen compounds, in particular with β-halogen substituted aliphatic ethers such, for example, as methyl β-chlorethyl ether or bis-β-chlorethyl ether, and still more particularly in combination with epihalogen hydrine, for example, epichlorohydrin, are sufficient to initiate the polymerization according to the process of the invention.

The concentration of the organo-metal component or components is in general within the range of 0.001 to 10% and advantageously 0.01 to 4%, calculated on the weight of the monomer or monomers used. In the catalyst system to be used according to the invention the ratio of the organo-metal compound or compounds to the halogen-containing organic compound or compunds may vary within wide limits. In general, however, a ratio will be chosen which is at least equimolecular since, as compared with the organo-metal compounds, the halogen-containing organic compounds to be used according to the invention have a greater ease of manufacture and can more easily be separated from the polymer. Besides, in many cases in which one or more halogen-containing organic compounds are used in an excess with respect to the organo-metal compound the activity of the catalyst is increased.

When metal or non-metal halide catalysts, for example, $BF_3$, $SnCl_4$, $SbCl_5$, $ZnCl_2$, $PF_5$ or complex compounds thereof for example, products obtained by the additional combination of boron trifluoride with ether such, for example, as boron trifluoride diethyl etherate or boron trifluoride tetrahydrofurane etherate or when salt-like complex compounds of boron trifluoride, for example, of triethyl oxonium fluoroborate, or of p-nitrophenyl diazonium fluorborate are used, the concentration of the catalyst is within the range of 0.01 to 10% and preferably 0.1 to 5%, calculated on the weight of the monomer.

In general the rate of polymerization increases as the concentration of the catalyst is increased. Besides, when the polymerization is carried out in the presence of an inert organic solvent the quantities of catalyst used are in general larger than in the block polymerization.

As can be seen from the examples the polymerization can be carried out in the absence or in the presence of inert organic solvents. Suitable solvents are above all halogen-containing hydrocarbons such as $CH_2Cl_2$, $CHCl_3$ and $CCl_4$, since the monomers dissolve well in these solvents even at low temperatures. There may also be used mixtures of halogen-containing solvents with aliphatic hydrocarbons such, for example, as pentane, hexane or heptane.

The temperature at which the polymerization is carried out may vary within wide limits and depends to a large extent on the type of catalyst, on the monomer and on the solvent. Polymers of high molecular weight are obtained in the presence of metal or non-metal halides in general only at temperatures below 0° C. and advantageously at temperatures within the range of —80° to —20° C.

When the above-described organo-metal catalyst systems are used polymers of high molecular weight are obtained at room temperature. In some of these cases, in particular in some cases of block polymerization it is even advantageous to apply a temperature within the range of 30° to 150° C.

The polymerization is in general terminated after a period within the range of 30 minutes to 15 hours.

The block polymer is worked up after having been disintegrated, the working up being advantageously brought about by washing with a solvent which does not dissolve the polymer, for example, methanol.

Ether-soluble polymers may also be placed into ether in order to be purified and then be precipitated again by introducing the solution drop by drop into an aliphatic hydrocarbon.

The suspension polymers are suitably worked up by filtering off the solid substance and by subsequently washing several times with methanol, if desired, while adding a trace of ethanol amine.

The polymers are dried at an elevated temperature, for example, at a temperature within the range of 50° to 100° C.

The polymerization of the 3,3-di-substituted oxacyclobutanes can be carried out continuously or discontinuously.

The individual monomers can be homopolymerized and they can also be copolymerized. The oxacyclobutane derivatives can be copolymerized with one another or with other oxacycloalkanes. As suitable copolymerization components there may be mentioned by way of example:

(a) Oxacyclopropanes, for examples, propylene oxide;
(b) Oxacyclobutanes, for example, 3,3-bis-(chloromethyl)-oxacyclobutane;
(c) Oxacyclopentanes, for example, tetrahydrofurane;
(d) Oxacyclooctanes, for example, 1,3,6-tri-oxacyclooctane.

In particular the combination of monomers, the homopolymerization of which yields a tough, rubber-elastic polymer, with monomers, the homopolymerization of which yields a very brittle crystalline polymer, leads to the formation of copolymers of very interesting technical properties, which even at high temperatures are distinguished by a high degree of strength and toughness and a low degree of brittleness. The crystalline polymers which can be prepared by the process of the invention have melting points above 120° C. and can be worked up thermoplastically into foils and shaped structures of any kind. They can even be spun into filaments by the melt-spinning process. Part of the amorphous rubber-elastic polymers are insoluble in the usual solvents and stable even at temperatures of about 200° C.

Owing to their polyfunctional character all the polymers can be modified in many ways. A vulcanization can, for example, be carried out by known methods with polyfunctional amines, for example, with aliphatic diamines such as ethylene diamine, hexamethylene diamine or hexamethylene diamine carbamate or N,N'-dicinnamylidene-1,6-hexamethylenediamine, in the presence of metal oxides such as MgO or ZnO which serve to absorb the acid. Sometimes a cross-linkage of the polymers can be observed already during the polymerization of the oxacyclobutanes in the presence of organo-aluminum compounds, principally during the block polymerization at temperatures of about 50° C.

It is also possible to incorporate filling materials such as silica gel, $BaSO_4$, $CaCO_3$ or carbon black. In some cases it is indicated to carry out the polymerization in the presence of the filling materials already. This measure enables a favorable distribution of the filling material in the polymer to be obtained.

Before the polymers are worked up they are suitably stabilized, for example, with a phenol, a phenol having one or more substituents, a phenol ether or a phenol ester. The stabilizers may be incorporated with the monomer in any way which enables the stabilizers to be distributed in the polymers to the largest possible extent.

The following examples serve to illustrate the invention but they are not intended to limit it thereto, the parts being by weight.

(A) PREPARATION OF THE MONOMERS (I) PREPARATION OF 3-CHLOROMETHYL-3-(1',1',2',2'-TETRAFLUORETHOXY) - METHYL - OXACYCLOBUTANE

3 - chloromethyl - 3 - (1',1',2',2' - tetrafluorethoxy)-methyloxacyclobutane (monomer I) was prepared by reacting 3-chloromethyl-3-oxymethyl-oxacyclobutane with tetrafluorethylene in benzene in the presence of about 5% by weight, calculated on the weight of the oxacyclobutane derivative, of sodium amide at a temperature within the range of 50° to 100° C. and under a pressure within the range of 10 to 30 atmospheres (gauge).

Monomer I had a boiling point of 66° C. under a pressure of 2.5 mm. of mercury and a density at 20° C. of 1.4012.

Analysis—$C_7H_9ClF_4O_2$ (236.6):

|  | Content of— | | | |
| --- | --- | --- | --- | --- |
|  | C | H | Cl | F |
| Calculated, percent | 35.5 | 3.9 | 15.0 | 32.1 |
| Found, percent | 35.6 | 4.1 | 15.0 | 30.4 |

Molecular weight: found 234; 235.

(II) PREPARATION OF 3-CHLOROMETHYL-3-(1',1',2'-TRIFLUORO-2'-CHLORETHOXY)-METHYL-OXACYCLOBUTANE 3-chloromethyl - 3 - (1',1',2'-trifluoro-2'-chlorethoxy)-methyl-oxacyclobutane (monomer II) was prepared by reacting 3-chloromethyl - 3 - oxymethyl-oxacyclobutane with trifluorethylene in the presence of about 4% by weight, calculated on the weight of the oxacyclobutane derivative, of sodium in liquid anhydrous ammonia at a temperature of —35° C.

Monomer II had a boiling point of 62° to 63.5° C. under a pressure of 1 mm. of mercury and a density at 20° C. of 1.4300.

Analysis—$C_7H_9F_3Cl_2O_2$ (253.1):

|  | Content of— | | | |
| --- | --- | --- | --- | --- |
|  | C | H | Cl | F |
| Calculated, percent | 33.2 | 3.6 | 28.0 | 22.5 |
| Found, percent | 33.6 | 3.8 | 28.2 | 21.1 |

(III) PREPARATION OF 3-CHLOROMETHYL-3-(1',1',2',3',3',3'-HEXAFLUOROPROPOXY)-METHYL-OXACYCLOBUTANE

3 - chloromethyl-3-(1',1',2',3',3',3'-hexafluoropropoxy)-methyloxacyclobutane (monomer III) was prepared by reacting 3 - chloromethyl - 3 - oxymethyl-oxacyclobutane with perfluoropropylene in benzene in the presence of 4% by weight, calculated on the weight of the oxacyclobutane derivative, of sodium amide at a temperature within the range of 30° to 60° C. under a pressure of 3 to 7 atmospheres (gauge).

Monomer III had a boiling point of 73° C. under a pressure of 4 mm. of mercury.

Analysis—$C_8H_9F_6ClO_2$ (286.6):

|  | Content of— | | | |
| --- | --- | --- | --- | --- |
|  | C | H | Cl | F |
| Calculated, percent | 33.5 | 3.2 | 12.4 | 39.8 |
| Found, percent | 34.6 | 3.3 | 12.9 | 37.0 |

(IV) PREPARATION OF 3,3-DI-[(1',1',2',2'-TETRAFLUOROETHOXY)-METHYL]-OXACYCLOBUTANE 3,3 - di-[(1',1',2',2'-tetrafluoroethoxy)-methyl]-oxacyclobutane (monomer IV) was prepared by reacting 3,3-dioxy-methyl-oxacyclobutane with tetrafluoroethylene in dioxane in the presence of 4% by weight, calculated on the weight of the oxacyclobutane derivative, of potassium at a temperature within the range of 80° to 110° C. and under a pressure of 20 to 30 atmospheres (gauge). Monomer IV had a boiling point of 67.8° C. under a pressure of 0.9 mm. of mercury and a density at 20° C. of 1.3578.

Analysis—$C_9H_{10}F_8O_3$ (318.2):

|  | Content of— | | |
| --- | --- | --- | --- |
|  | C | H | F |
| Calculated, percent | 34.0 | 3.2 | 47.8 |
| Found, percent | 34.1 | 3.2 | 48.6 |

Molecular weight: found: 321.

(V) PREPARATION OF 3,3-DI-[(1',1',2'-TRIFLUORO-2'-CHLORETHOXY)-METHYL]-OXACYCLOBUTANE 3,3-di-[(1',1',2' - trifluoro - 2' - chlorethoxy) - methyl]-oxacyclobutane (monomer V) was prepared by reacting 3,3-dioxymethyl - oxacyclobutane with trifluorochlorethylene in anhydrous liquid ammonia at —35° C. in the presence of 3% by weight, calculated on the weight of the oxacyclobutane derivative, of sodium. Monomer V had a boiling point of 77° C. under a pressure of 0.01 mm. of mercury and a density at 20° C. of 1.4008.

Analysis—$C_9H_{10}F_6Cl_2O_3$ (351.1):

|  | Content of— | | | |
| --- | --- | --- | --- | --- |
|  | C | H | Cl | F |
| Calculated, percent | 30.8 | 2.9 | 20.2 | 32.5 |
| Found, percent | 31.0 | 3.0 | 20.4 | 32.2 |

Molecular weight: found: 350.

(VI) PREPARATION OF 3,3-DI-[(1',1'-DIFLUORO-2',2'-DICHLORETHOXY)-METHYL]-OXACYCLOBUTANE 3,3-di-[(1',1'-difluoro - 2',2' - dichlorethoxy) - methyl]-oxacyclobutane (monomer VI) was prepared by reacting 3,3-dioxymethyl-oxacyclobutane with difluoro-dichlorethylene in dioxane in the presence of 3% by weight, calculated on the weight of the oxacyclobutane derivative, of potassium at a temperature within the range of 20° to 30° C.

Monomer VI had a boiling point of 93° C. under a pressure of 0.005 mm. of mercury and a density at 20° C. of 1.4447.

Analysis—$C_9H_{10}Cl_4F_4O_3$ (383.9):

|  | Content of— | | | |
| --- | --- | --- | --- | --- |
|  | C | H | Cl | F |
| Calculated, percent | 28.2 | 2.7 | 36.9 | 19.8 |
| Found, percent | 28.8 | 2.7 | 36.5 | 19.2 |

Molecular weight: found: 379.

(B) POLYMERIZATION

*Example 1*

POLYMERIZATION OF 3-CHLOROMETHYL-3-(1',1',2',2'-TETRAFLUORETHOXY) - OXACYCLOBUTANE (MONOMER I)

93 parts of monomer I were combined with 130 parts of methylene chloride with the exclusion of air and moisture. At —5° C. 0.9 part of aluminum triethyl was added. Then 2.5 parts of epichlorohydrin were added dropwise while stirring, and stirring of the batch was continued at a temperature within the range of —5° to 25° C. Polymerization set in very quickly. In the course of the polymerization a very tough, rubber-elastic polymer formed. In order to be worked up the polymer was disintegrated, boiled several times with hot methanol and dried at 80° C. in vacuo. A very solid, turbid, milky, rubber-elastic polymer remained behind which was insoluble in the usual organic solvents such as alcohol, ether, halogenated hydrocarbons or ketones.

When heated for 30 minutes on the Kofler bench, the polymer retained its form and did not change its colour at temperatures of up to 190° C. At 220° C. a slow decomposition set in which was accompanied by decoloration. Yield: 91 parts.

Analysis:

|  | Content of— | | | |
|---|---|---|---|---|
|  | C | H | Cl | F |
| Found, percent | 36.2 | 4.1 | 15.3 | 31.0 |

In order to further characterize the rubber-elastic polymer the following values were determined:

(1) Defo-hardness according to DIN specification No. 53,514.
(2) Defo-elasticity according to DIN specification No. 53,514.

For this purpose test specimens were prepared under the following conditions.

(a) Preheating: 2 minutes at 220° C.,
(b) Compression: 1 minute at 220° C. under a pressure of 150 kilograms per square centimeter,
(c) Cooling: 2 minutes under a pressure of 150 kilograms per square centimeter.

The results of the tests are indicated in the following table which, for reasons of comparison, also comprises the results obtained in the same tests with a non-masticated natural rubber and a synthetic rubber (cold rubber prepared from butadiene and 25% of styrene).

| Polymer | Defo-hardness | Defo-elasticity |
|---|---|---|
| Polymer according to Example 1 | 6,000 | 59 |
| Natural rubber | 3,000 to 4,000 | 30 to 50 |
| Synthetic rubber | 900 to 1,000 | 20 |

Example 2

POLYMERIZATION OF 3-CHLOROMETHYL - 3 - (1',1',2'-TRIFLUORO - 2' - CHLORETHOXY)-METHYL - OXACYCLOBUTANE (MONOMER II)

110 parts of monomer II and 145 parts of methylene chloride were cooled to —10° C. under an atmosphere of dry nitrogen and combined with 1 part of aluminum triethyl. Subsequently 3.5 parts of epichlorohydrin were added while stirring. Polymerization set in after a few minutes. The polymerization batch was maintained at a temperature within the range of —5° to 25° C. In the course of the polymerization a tough, rubber-elastic polymer precipitated. In order to be worked up the polymer was dissolved in methylene chloride under reflux and precipitated with pentane after the addition of 2 parts of methanol. The polymer was dried at 80° C. in vacuo. Yield: 96 parts.

The polymer was very tough and of rubber-elastic consistency. Its reduced viscosity which was determined in a 0.1% solution of $CH_2Cl_2$ at 25° C. was 3.37. When heated on a Kofler bench for 30 minutes the polymer retained its form at temperatures of up to 150° C. and at temperatures above 190° C. it began to decompose slowly.

Analysis:

|  | Content of— | | | |
|---|---|---|---|---|
|  | C | H | Cl | F |
| Found, percent | 33.6 | 3.8 | 28.1 | 21.2 |

In order to further characterize the rubber-elastic polymer, its Defo-hardness and Defo-elasticity were determined according to DIN specification No. 53,514.

For this purpose test specimens were prepared under the following conditions.

(a) Preheating: 3 minutes at 240° C.,
(b) Compression: 3 minutes at 240° C. under a pressure of 150 kilograms per square centimeter,
(c) Cooling: 5 minutes under a pressure of 150 kilograms per square centimeter.

On the test specimens so obtained the following values were measured:

(1) Defo-hardness _____ 2000
(2) Defo-elasticity _____ 50

Example 3

COPOLYMERIZATION OF 3-CHLOROMETHYL-3-(1',1',2'-TRIFLUORO - 2' - CHLORETHOXY)-METHYL - OXACYCLOBUTANE (MONOMER II) WITH 3,3-BIS-(CHLOROMETHYL)-OXACYCLOBUTANE 85 parts of 3,3-bis-(chloromethyl)-oxacyclobutane, 14 parts of monomer II and 145 parts of methylene chloride were cooled to —5° C. with the exclusion of moisture and air and combined with 1 part of aluminum triethyl. Then 3.5 parts of epichlorohydrin were added dropwise while stirring. Polymerization set in after a few minutes. In the course of the polymerization the polymer precipitated. In order to be worked up, the tough solid polymer was disintegrated, boiled several times with methanol under reflux and dried at 80° C. in vacuo. Yield: 92 parts.

The polymer had a melting point within the range of 150° to 160° C. and could be worked up into very tough, elastic foils which were entirely transparent.

The reduced viscosity of the product which was determined in a solution of 0.1% strength by weight in tetrahydrofurane at 25° C. was 4.02.

Analysis:

|  | Content of— | | | |
|---|---|---|---|---|
|  | C | H | Cl | F |
| Found, percent | 38.1 | 5.2 | 43.1 | 2.7 |

The polymer had a density of 1.415.

Example 4

POLYMERIZATION OF 3-CHLOROMETHYL-3-(1',1',2',3',3',3'-HEXAFLUOROPROPOXY) - METHYL-OXACYCLOBUTANE (MONOMER III)

6 parts of monomer III were combined with 0.2 part of epichlorohydrin with the exclusion of moisture and air and 0.07 part of aluminum triethyl was added at room temperature. Polymerization set in after a short time. In the course of the polymerization the temperature rose to 34° C. A solid polymer block formed which was dissolved in methylene chloride under reflux. After a filtration the polymer was precipitated with methanol and dried at 50° C. in vacuo. Yield: 4.5 parts.

The polymer was of tough, rubber-elastic consistency. When heated on the Kofler bench for 30 minutes it retained its form at temperatures of up to 210° C. It had a density of 1.51.

Its reduced viscosity which was determined in a 0.1% solution of tetrahydrofurane at 25° C. was 0.77.

Analysis:

|  | Content of— | | | |
|---|---|---|---|---|
|  | C | H | Cl | F |
| Found, percent | 35.0 | 3.7 | 12.9 | 35.3 |

Example 5

POLYMERIZATION OF 3,3-DI-[(1',1',2',2'-TETRAFLUOR-ETHOXY)-METHYL]-OXACYCLOBUTANE (MONOMER IV)

32 parts of monomer IV were combined with 20 parts of methylene chloride and 20 parts of pentane and the batch was cooled to 0° C. In the course of 30 minutes 0.22 part of gaseous $BF_3$ was then introduced. Polymerization set in slowly. In the course of the polymerization the polymer precipitated in the form of a fine powder. After the polymerization was terminated 0.3 part of ethanol amine and 4 parts of methanol were added while stirring, the solid substance was filtered off and boiled several times with methanol under reflux. The polymer was dried at 80° C. in vacuo. Yield: 30 parts.

The polymer had a melting point of 134° C. It was soluble at room temperature in acetone, tetrahydrofurane and dimethyl formamide. Its reduced viscosity which was determined in a 0.1% solution of tetrahydrofurane at 25° C. was 0.26. Its density was 1.590.

Analysis:

|  | Content of— | | |
| --- | --- | --- | --- |
|  | C | H | F |
| Found, percent | 34.1 | 3.3 | 47.3 |

Example 6

POLYMERIZATION OF 3,3-DI-[(1',1',2',2'-TETRAFLUOR-ETHOXY)-METHYL]-OXACYCLOBUTANE (MONOMER IV)

45 parts of monomer IV were combined with 0.9 part of aluminum triethyl and 2.2 parts of epichlorohydrin with the exclusion of moisture and air and the batch was allowed to stand for 24 hours at 45° to 50° C. Polymerization set in slowly. In the course of the polymerization a solid polymer block formed which after having been disintegrated was boiled several times with methanol and dried in vacuo at 80° C. Yield: 36 parts.

The polymer had a melting point of 158° C. It was insoluble in the usual organic solvents which was probably due to cross-linkage.

The polymer had a density of 1.626.

Analysis:

|  | Content of— | | |
| --- | --- | --- | --- |
|  | C | H | F |
| Found, percent | 34.1 | 3.4 | 43.3 |

Example 7

POLYMERIZATION OF 3,3-DI-[(1',1',2'-TRIFLUORO-2'-CHLORETHOXY)-METHYL]-OXACYCLOBUTANE (MONOMER V)

70 parts of monomer V were combined with 45 parts of pentane, 35 parts of methylene chloride and 0.8 part of aluminum triethyl at 10° C. with the exclusion of moisture and air. 2 parts of epichlorohydrin were then added drop by drop while stirring.

Polymerization set in after a few minutes. In the course of the polymerization the polymer precipitated in the form of a powder. In order to be worked up the polymer was boiled several times with methanol and then dried in vacuo at 80° C. Yield: 58 parts.

A part of the polymer was dissolved in acetone, precipitated in water and dried. The polymer melted at a temperature of about 130° C. while forming a clear molten mass and it could well be worked up into foils. It was soluble in many polar solvents.

Its reduced viscosity which was determined in a 0.1% solution of tetrahydrofurane at 25° C. was 2.1

Analysis:

|  | Content of— | | | |
| --- | --- | --- | --- | --- |
|  | C | H | Cl | F |
| Found, percent | 30.8 | 3.1 | 20.6 | 32.3 |

In order to further characterize the polymer a sheet 1 mm. thick was prepared from the product under the following conditions.

(a) Compression: 30 seconds at 150° C. under a pressure of 40 kilograms per square centimeter,
(b) Cooling: 10 seconds under a pressure of 40 kilograms per square centimeter.

On the sheet which was thus prepared the following values were measured:

Tensile strength _____ kg./cm.$^2$__ 122
Stress at yield point _____ kg./cm.$^2$__ 176
Elongation at break _____ percent__ 210
Density _____ 1.618

Example 8

POLMERIZATION OF 3,3-DI-[(1',1',2'-TRIFLUORO-2'-CHLORETHOXY)-METHYL]-OXACYCLOBUTANE (MONOMER V)

50 parts of monomer V were combined with 40 parts of pentane and 15 parts of methylene chloride with the exclusion of moisture. The batch was cooled to 0° C. and 0.74 part of gaseous $BF_3$ was introduced slowly. Polymerization set in slowly. In the course of the polymerization the polymer precipitated in the form of a white powder. When the polymerization was terminated 2 parts of ethanolamine and 4 parts of methanol were added to the batch while stirring. The polymer was then filtered off, boiled several times with methanol under reflux and dried in vacuo at 80° C. Yield: 49 parts.

A part of the polymer was dissolved in acetone, precipitated in water and dried. The polymer melted at 128° C. and from the melt filaments could easily be spun. With respect to solubility the behaviour of this polymer was analogous to that of the polymer prepared according to Example 7.

The reduced viscosity of the product which was determined in a solution of 0.1% strength by weight of tetrahydrofurane at 25° C. was 0.3. Hence follows that the polymer prepared in the manner described in Example 8 has a considerably lower molecular weight than the polymer prepared according to Example 7.

Analysis:

|  | Content of— | | | |
| --- | --- | --- | --- | --- |
|  | C | H | Cl | F |
| Found, percent | 30.8 | 3.1 | 20.1 | 32.2 |

Example 9

COPOLYMERIZATION OF 3,3-DI-[(1',1',2'-TRIFLUORO-2'-CHLORETHOXY)-METHYL]-OXACYCLOBUTANE (MONOMER V) WITH 3,3-BIS-(CHLOROMETHYL)-OXACYCLOBUTANE 60 parts of monomer V, 19 parts of 3,3-bis-(chloromethyl)-oxacyclobutane, 50 parts of pentane and 37 parts of methylene chloride were combined with 1.5 parts of aluminum triethyl at 10° C. with the exclusion of moisture and air. Subsequently 3.7 parts of epichlorohydrin were added while stirring. Polymerization set in slowly. In the course of the polymerization the temperature was increased to 25° C. The polymer precipitated in the form of a powder. After the polymerization had been terminated 2 parts of methanol were added to the batch, the polymer was filtered off, boiled several times with pentane under reflux and dried at 80° C. in vacuo. Yield: 77 parts.

A part of the polymer was dissolved in acetone, precipitated with water and dried. The polymer melted at a temperature of about 122° C. while forming a clear melt from which filaments could easily be spun. The polymer was also suitable for use in the preparation of foils.

The reduced viscosity of the product which was determined in a 0.1% solution of toluene at 55° C. was 0.55.

Analysis:

|  | Content of— | | | |
| --- | --- | --- | --- | --- |
|  | C | H | Cl | F |
| Found, percent | 30.9 | 3.6 | 20.7 | 30.2 |

In order to further characterize the copolymer the product was made up into a sheet 1 mm. thick under the following conditions.

(a) Compression: 30 seconds at 150° C. under a pressure of 40 kilograms per square centimeter,
(b) Cooling: 10 seconds under a pressure of 40 kilograms per square centimeter.

On the sheet which was thus obtained the following values were measured:

Tensile strength _____ kg./cm.$^2$__ 112
Stress at yield point _____ kg./cm.$^2$__ 174
Elongation at break _____ percent__ 363
Density _____ 1.1616

*Example 10*

POLYMERIZATION OF 3,3-DI-[(1',1'-DIFLUORO-2',2'-DICHLORETHOXY)-METHYL]-OXACYCLOBUTANE (MONOMER VI)

55 parts of monomer VI and 2.3 parts of epichlorohydrin were combined with 0.9 part of aluminum triethyl with the exclusion of air and moisture and the batch was allowed to stand for 24 hours at a temperature within the range of 45° to 50° C. In the course of the polymerization a very hard polymer block formed which was disintegrated, boiled several times with methanol and dried in vacuo at 80° C. Yield: 38 parts.

The polymer melted at a temperature of about 158° C. and was insoluble in the usual organic solvents. It had a density of 1.640.

Analysis:

|  | Content of— | | | |
| --- | --- | --- | --- | --- |
|  | C | H | Cl | F |
| Found, percent | 29.3 | 2.9 | 36.0 | 19.0 |

*Example 11*

POLYMERIZATION OF 3,3,-DI-[(1',1'-DIFLUORO-2',2'-DICHLOROETHOXY)-METHYL]-OXACYCLOBUTANE MONOMER VI)

100 parts of monomer VI were dissolved in 195 parts of methylene chloride with the exclusion of moisture and 3 parts of gaseous BF$_3$ were introduced within 30 minutes at —40° C. into the resulting solution. Polymerization set in slowly. The batch was stirred for 12 hours at a temperature within the range of —40° to —25° C. Then 100 parts of methylene chloride, 10 parts of methanol and 5 parts of ethanol amine were added. The polymer was filtered off, dissolved in acetone, precipitated with water and dried in vacuo at 80 C. Yield: 64 parts.

The polymer melted at about 146° C. From the melt filaments could easily be spun. The reduced viscosity of the polymer which was determined in a 0.1% solution of tetrahydrofurane at 25° C. was 0.12. The polymer was soluble in acetone, tetrahydrofurane and dimethyl formamide.

Analysis:

|  | Content of— | | | |
| --- | --- | --- | --- | --- |
|  | C | H | Cl | F |
| Found, percent | 28.8 | 2.9 | 36.0 | 19.1 |

*Example 12*

In this example and the next one an unsaturated oxacyclobutane derivative was used as starting material in the polymerization. The derivative was prepared from 3,3-di-[(1',1',2'-trifluor-2'-chlorethoxy) - methyl] - oxacyclobutane by splitting off hydrogen fluoride in the presence of methanolic potassium hydroxide solution. For this purpose a solution of methanol which contained 35% by weight of potassium hydroxide was added at a temperature within the range of 130° to 140° C. to 75 parts of monomer V. During the reaction the methanol was continuously removed from the reaction mixture. In the course of the reaction potassium fluoride separated out at the bottom of the reaction vessel. When the reaction was terminated water was added, the organic phase was taken up in benzene, the benzene solution was dried and the benzene was distilled off.

In the distillation under reduced pressure the unsaturated oxacyclobutane derivative passed over at a boiling point of 65° C. under a pressure of 0.001 mm. of mercury. The derivative was very reactive and after having been allowed to stand for a prolonged time it began to polymerize spontaneously.

Analysis—Starting product:

|  | Content of— | | | |
| --- | --- | --- | --- | --- |
|  | C | H | Cl | F |
| Percent | 31.0 | 3.0 | 20.4 | 32.2 |

Analysis—Reaction product:

|  | Content of— | | | |
| --- | --- | --- | --- | --- |
|  | C | H | Cl | F |
| Percent | 31.8 | 3.1 | 20.9 | 30.7 |

20 parts of the unsaturated oxacyclobutane derivative obtained from monomer V by the splitting off of hydrogen fluoride by means of alcoholic potassium hydroxide solution were dissolved in 15 parts of pentane and 10 parts of methylene chloride. At 0° C., 0.24 gram of gaseous BF$_3$ was added to the solution.

Polymerization set in quickly. In the course of the polymerization the polymer precipitated. In order to be worked up the product was disintegrated, boiled several times while methanol containing 1% by weight of ethanol amine was added, filtered off and dried in vacuo at 80° C. Yield: 14 parts.

The polymer had a melting point of about 182° C. It was insoluble in all usual solvents.

*Example 13*

6 parts of the oxacyclobutane derivative obtained according to Example 12 from monomer V by splitting off hydrogen fluoride by means of alcoholic potassium hydroxide solution were combined with 5 parts of pentane and 3 parts of methylene chloride. At room temperature 0.15 part of epichlorohydrin and 0.075 part of aluminum triethyl were added. Polymerization set in slowly. In the course of the polymerization the polymer precipitated.

It was boiled several times with methanol and dried in vacuo at 80° C. Yield: 4.8 parts.

The polymer had a melting point above 165° C. It was insoluble in the usual organic solvents.

We claim:
1. A process for the manufacture of polymers of substituted oxacyclobutanes which comprises the step of polymerizing at least one monomer of the formula

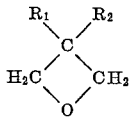

wherein $R_1$ represents a member selected from the group consisting of a polyhalogen-alkoxy-alkyl radical and a halogen alkyl radical and $R_2$ represents a polyhalogen-alkoxy-alkyl radical at a temperature within the range of —80° C. and 150° C. while in contact with a catalyst selected from the group consisting of Friedel-Crafts catalysts and a catalyst system consisting of an organo-metal compound and a β-halogen substituted aliphatic ether, the amount of said catalyst being within the range of 0.001 to 10% calculated upon the weight of the monomers.

2. A process for the manufacture of polymers of substituted oxacyclobutanes which comprises the step of polymerizing at least one monomer selected from the group consisting of 3-chloromethyl-3-(1',1',2',2'-tetrafluorethoxy)-methyl-oxacyclobutane, 3 - chloromethyl - 3 - (1',1',2'-trifluoro-2'-chlorethoxy) - methyl - oxacyclobutane, 3-chloromethyl - 3 - (1',1',2',3',3',3' - hexafluoropropoxy)-methyl-oxacyclobutane, 3,3-di - [(1',1',2',2' - tetrafluorethoxy)-methyl]-oxacyclobutane, 3,3 - di - [(1',1',2'-trifluoro-2'-chlorethoxy)-methyl]-oxacyclobutane and 3, 3-di-[(1',1'-difluoro-2',2'-dichlorethoxy) - methyl] - oxacyclobutane at a temperature within the range of —80° C. and 150° C. while in contact with a catalyst selected from the group consisting of Friedel-Crafts catalysts and a catalyst system consisting of an organo-metal compound and a β-halogen substituted aliphatic ether, the amount of said catalyst being within the range of 0.001 to 10% calculated upon the weight of the monomers.

3. A process for the manufacture of polymers of substituted oxacyclobutanes which comprises the step of copolymerizing at least one monomer of the formula

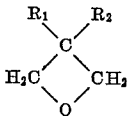

wherein $R_1$ represents a member selected from the group consisting of a polyhalogen-alkoxy-alkyl radical and a halogen alkyl radical and $R_2$ represents a polyhalogen-alkoxy-alkyl radical with at least one monomer selected from the group consisting of oxacyclopropanes, oxacyclobutanes, oxacyclopentanes and oxacyclooctanes at a temperature within the range of —80° C. and 150° C. while in contact with a catalyst selected from the group consisting of Friedel-Crafts catalysts and a catalyst system consisting of an organo-metal compound and a β-halogen substituted aliphatic ether, the amount of said catalyst being within the range of 0.001 to 10% calculated upon the weight of the monomers.

4. A homopolymer of a member selected from the group consisting of 3-chloromethyl-3-(1',1',2',2'-tetrafluorethoxy)-methyl-oxacyclobutane, 3 - chloromethyl - 3 - (1',1',2'-trifluoro-2'-chlorethoxy)-methyl-oxacyclobutane, 3-chloromethyl-3 - (1',1',2',3',3',3' - hexafluoropropoxy)-methyl-oxacyclobutane, 3,3-di-[(1',1',2',2'-tetrafluorethoxy)-methyl]-oxacyclobutane, 3,3-di-[(1',1',2'-trifluoro-2'-chlorethoxy)-methyl]-oxacyclobutane and 3,3-di-[(1', 1'-difluoro-2',2'-dichlorethoxy)-methyl]-oxacyclobutane.

5. A copolymer of at least two members selected from the group consisting of 3-chloromethyl-3-(1',1',2',2'-tetrafluorethoxy)-methyl-oxacyclobutane, 3-chloromethyl-3-(1',1',2'-trifluoro-2'-chlorethoxy) - methyl - oxacyclobutane, 3-chloromethyl - 3 - (1',1',2',3',3',3' - hexafluoropropoxy)-methyl-oxacyclobutane, 3,3-di - [(1',1',2',2' - tetrafluorethoxy)-methyl]-oxacyclobutane, 3,3 - di - [(1',1',2'-trifluoro-2'-chlorethoxy)-methyl]-oxacyclobutane and 3, 3-di-[(1',1'-difluoro-2',2'-dichlorethoxy) - methyl] - oxacyclobutane.

6. A copolymer of at least one member selected from the group consisting of 3-chloromethyl-3-(1',1',2',2'-tetrafluorethoxy)-methyl-oxacyclobutane, 3 - chloromethyl - 3 - (1',1',2'-trifluoro-2'-chlorethoxy) - methyl - oxacyclobutane, 3-chloromethyl-3 - (1',1',2',3',3',3' - hexafluoropropoxy)-methyl-oxacyclobutane, 3,3-di-[(1',1',2',2' - tetrafluorethoxy)-methyl]-oxacyclobutane, 3,3 - di - [(1',1',2'-trifluoro-2'-chlorethoxy)-methyl]-oxacyclobutane and 3, 3-di-[(1',1'-difluoro-2',2'-dichlorethoxy) - methyl] - oxacyclobutane with at least one member selected from the group consisting of propylene oxide, 3,3-bis-(chloromethyl)-oxacyclobutane, tetrahydrofurane and 1,3,6-tri-oxacyclooctane.

References Cited by the Examiner
FOREIGN PATENTS
758,450   10/56   Great Britain.

MURRAY TILLMAN, *Primary Examiner.*

HAROLD N. BURSTEIN, *Examiner.*